United States Patent [19]

Pederson et al.

[11] Patent Number: 5,114,702

[45] Date of Patent: May 19, 1992

[54] METHOD OF MAKING METAL OXIDE CERAMIC POWDERS BY USING A COMBUSTIBLE AMINO ACID COMPOUND

[75] Inventors: Larry R. Pederson, Kennewick; Lawrence A. Chick, Richland; Gregory J. Exarhos, Richland, all of Wash.

[73] Assignee: Battelle Memorial Institute, Richland, Wash.

[21] Appl. No.: 599,273

[22] Filed: Oct. 16, 1990

Related U.S. Application Data

[63] Continuation of Ser. No. 362,613, Jun. 7, 1989, abandoned, which is a continuation-in-part of Ser. No. 238,643, Aug. 30, 1988, abandoned.

[51] Int. Cl.$^5$ ............................................. C01B 13/14
[52] U.S. Cl. ..................................... 423/639; 505/1; 505/782; 423/263; 423/592; 423/594; 423/595; 423/596; 423/604; 423/607; 423/608; 423/625; 423/632; 423/636; 501/153; 501/152; 501/135; 501/123
[58] Field of Search ............... 423/263, 608, 604, 594, 423/266, 265, 593, 595, 596, 599, 605, 607, 625, 632, 636, 639; 505/1, 135, 152, 153, 123; 427/62, 63, 226, 168; 252/521, 62.57; 502/355, 525

[56] References Cited

U.S. PATENT DOCUMENTS

| | | | |
|---|---|---|---|
| 2,763,569 | 9/1956 | Bradstreet et al. | 427/226 |
| 3,330,697 | 7/1967 | Pechini | 117/215 |
| 3,872,027 | 3/1975 | Christmann et al. | 585/661 |
| 3,893,821 | 7/1975 | Davies et al. | 423/595 |
| 4,029,738 | 6/1977 | Courty et al. | 423/213.2 |
| 4,038,336 | 7/1977 | Besozzi et al. | 585/655 |
| 4,077,808 | 3/1978 | Church et al. | 501/103 |
| 4,293,534 | 10/1981 | Arendt | 423/593 |
| 4,295,868 | 11/1981 | Hölter | 55/302 |
| 4,473,542 | 9/1984 | David | 423/594 |
| 4,508,841 | 4/1985 | Onuma et al. | 423/608 |
| 4,589,969 | 5/1986 | Yurkov et al. | 427/126.5 |
| 4,742,030 | 5/1988 | Masaki et al. | 423/608 |
| 4,772,511 | 9/1988 | Wood et al. | 501/108 |
| 4,772,576 | 8/1988 | Kimura et al. | 423/593 |
| 4,804,649 | 2/1989 | Sherif | 423/593 |
| 4,810,339 | 3/1989 | Heavens et al. | 505/818 |
| 4,845,056 | 7/1989 | Yamanis | 501/12 |

FOREIGN PATENT DOCUMENTS

62-59531  3/1987  Japan .................................. 423/628

OTHER PUBLICATIONS

Baythoun et al., Journal of Materials Science 17 (1982) 2757-2769 "Production of Strontium-Substituted Lanthanum Manganite Perovskite Powder by the Amorphous Citrate Process".
Chick, L. A. et al., "Synthesis of Air-Sinterable Lanthanum Chromite Powders", Proceedings of the First International Symposium on Solid Oxide Fuel Cells, the Electrochemical Society, N.J. pp. 170-187, 1989.
Baythoun et al., "J. of Material Science", 17, 1982, pp. 2757-2769.
Anderton et al., Powder Metallurgy #1, 1979, pp. 14-21.
Japanese Journal of Applied Physics, vol. 26, No. 10, Oct. 1987, Maki Kawai et al., "Formation of Y-Ba-Cu-O Super Conducting Film by Spray Pyrolysis Method", pp. L1740-L1742.
Budd et al., "Preparation of Strontim Titinate Ceramics and Internal Boundary Layer Capacitors by the Pechini Method", Mat. Res. Soc. Symp. Proc. vol. 32 (1984) pp. 239-244.
Mat. Res. Soc. Symp. Proc. vol. 99, 30 Nov. 1987, Maki Kawai et al, "Properties of Y-Ba-Cu-O Films Formed by Spray Pyrolysis Method", pp. 331-334.
D. M. Roy et al., "Preparation of Fine Oxide Powder by Evaporative Decomposition of Solutions", Am Ceramic Soc. Bull, vol. 56 (1977) pp. 1023-1024.

Primary Examiner—John Niebling
Assistant Examiner—Edward Squillante
Attorney, Agent, or Firm—Marger, Johnson, McCollom & Stolowitz

[57] ABSTRACT

This invention is directed to the formation of homogeneous, aqueous precursor mixtures of at least one substantially soluble metal salt and a substantially soluble, combustible co-reactant compound, typically an amino acid. This produces, upon evaporation, a substantially homogeneous intermediate material having a total solids level which would support combustion. The homogeneous intermediate material essentially comprises highly dispersed or solvated metal constituents and the co-reactant compound. The intermediate material is quite flammable. A metal oxide powder results on ignition of the intermediate product which combusts same to produce the product powder.

21 Claims, No Drawings

METHOD OF MAKING METAL OXIDE CERAMIC POWDERS BY USING A COMBUSTIBLE AMINO ACID COMPOUND

The United States Government has rights in this invention in accordance with the operating contract DE-AC06-76RLO 1830 between Battelle Memorial Institute and the U.S. Department of Energy.

RELATED APPLICATIONS

This is a continuation of application Ser. No. 07/362,613 filed June 7, 1989 and now abandoned, which is a continuation-in-part application of pending prior application U.S. Ser. No. 07/238,643, filed on Aug. 30, 1988.

BACKGROUND OF THE INVENTION

This invention relates to metal oxide powders useful in the production of various ceramic materials, and to processes for making such metal oxide ceramic powders, particularly metal oxide ceramic powders of fine particle size.

Fine particle size (0.1–1.0 micron diameter), metal oxide powders are highly desirable in ceramic product manufacturing. Sintering of these fine powders occurs at temperatures much lower than most larger-sized commercial powders.

The traditional methods for producing ceramic powders involve mechanically mixing the component oxides in their appropriate stoichiometric amounts, calcining the solution at high temperature to obtain a single phase, and mechanically milling the product to obtain the desired particle size. However, high temperature calcination promotes crystal growth, which is an undesirable effect, the desired end product being a fine-grained ceramic powder. On the other hand, mechanical milling often introduces unwanted impurities into the final ceramic powder product.

A number of somewhat complicated chemical methods have been developed to produce fine ceramic powders. Included are controlled hydrolysis and condensation of metal alkoxides (sol gel), flame oxidation, and spray drying of a colloidal suspension, freeze-drying, and coprecipitation.

In U.S. Pat. No. 3,330,697, a method of producing electrical capacitors is described employing lead and alkaline earth titanates, zirconates and niobates. These compounds are used in selected combinations and proportions to form resin intermediates. Calcination of the resin intermediates removes the organic material and leaves a metal oxide powder, ideally in a finely divided state. A list of compounds which can be used in this process are provided in column 2, lines 62–67.

In a subsequent article in Mat. Res. Soc. Symp. Proc., Vol. 32, pages 239–244 (1984), entitled, *Preparation Of Strontium Titanate Ceramics In Internal Boundary Layer Capacitors By The Pechini Method*, by Budd, et al., strontium titanate is described as one of the titanate perovskite materials that are widely used in the electronic ceramics industry. In the study described in the article, a liquid resin-forming technique, as described in the above U.S. Pat. No. 3,330,697 was used to prepare the strontium titanate powders.

In an article entitled, *Preparation of Fine Organic Powders by Evaporative Decomposition Solutions*, by D. M. Roy, et al., in Am. Ceram. Soc. Bull., Vol 56, at page 1023 (1977), the authors describe ceramic powder production by evaporative decomposition of solutions. Specifically, aluminum oxide and calcium aluminum oxide powders were prepared in laboratory scale furnaces using the EDS technique. Details of the furnace and atomizer assembly, respectively, employed in the EDS method are set forth in FIGS. 1 and 2 of the Roy article.

Accordingly, a need exists for a process for producing a ceramic powder, particularly a fine, single-phase ceramic powder, without the use of complex equipment such as the above-described EDS furnace, which can be produced in a direct manner with a minimum amount of skill and labor, and which provides a high-quality product.

SUMMARY OF THE INVENTION

This invention is directed to metal oxide powders, and to methods for making same, and overcomes some of the above problems associated with the prior art processes for producing ceramic powders. The process of this invention is direct and relatively simple, requiring a minimum level of skill and labor to complete, is relatively low cost, and produces an fine metal oxide powder which is high in quality and which is typically formed as a single-phase ceramic powder.

The process generally includes the formation of homogeneous, aqueous precursor mixtures of at least one substantially soluble metal salt and a substantially soluble, combustible co-reactant compound, typically an amino acid. This produces, upon evaporation, a substantially homogeneous intermediate material having a concentration which would support combustion. The homogeneous intermediate material essentially comprises highly dispersed or solvated metal constituents and the co-reactant compound. The intermediate material is quite flammable. A metal oxide powder results on ignition of the intermediate product, which combusts same to produce the product powder. The combustion step is typically conducted at a temperature which will consume substantially all of the amino acid compound, but which will neither substantially melt the metal oxide powder nor cause the loss of volatile components thereof. Combustion should therefore be conducted to avoid a substantial loss of stoichiometry or the formation of incorrect cystalline phases in the metallic oxide powder product. Calcination of the product can then be conducted to remove any residual organic phase so that submicron ceramic particles of the above-described metal oxide powder are obtained.

The foregoing and other objects, features and advantages of the invention will become more readily apparent from the following detailed description of a preferred embodiment which proceeds with reference to the drawings.

DETAILED DESCRIPTION OF THE INVENTION

This invention comprises the production of metal oxide ceramic powders from an initial precursor aqueous solution of a corresponding metal salt and an amino acid. The particular metal elements of the metal salts that can be used in the process of this invention are those which will form a substantially water soluble salt and can be converted to a metal oxide during burning of the metal salt/amino acid/water solution. This is contrary to the U.S. Pat. No. 3,330,697 which states that compounds such as nitrates did not serve the objectives of that invention. Metal cations that are useful in producing the metal oxide powders of this invention are aluminum, calcium, chromium, manganese, iron, nickel, copper, strontium, yttrium, zirconium, silver, thallium, barium, lanthanum and bismuth, as well as lithium, sodium, magnesium, potassium, scandium, zinc, rubidium, cadmium, indium, cesium, mercury, lead, cerium, praseodymium, neodymium, samarium, europium, gadolinium, terbium, dysprosium, holmium, erbium, thulium, ytterbium, lutetium, uranium, thorium, cobalt, hafnium and molybdenum, respectively.

The anions which are particularly useful in this invention are those which exhibit substantial solubility in aqueous mixture, and which decompose with little or no residue during ignition of the metal salt/amino acid aqueous precursor mixture. Anions suitable for use in this process include acetates, formates, halides (particularly chlorides, bromides, iodides), oxyhalides (particularly perchlorates, perbromates, periodates, chlorates, bromates, iodates, chlorites, bromites, and iodites), sulphates, carbonates and nitrates, respectively. However, the anion of choice is the nitrate ion. Nitrate compounds are quite soluble in water, are widely available, and are stable in a water mixture. Nitrates also provide oxygen to combust the amino acids. Very little residue (less than 1%) remains in the ash after ignition of a metal nitrate/amino acid mixture. Furthermore, any residue from the use of nitrates can be essentially eliminated by calcining the ash at a temperature of about 600°–700° C.

Metal salt reactants capable of producing the powders of the present invention include the following compounds: Lanthanum nitrate hydrate, such as $La(NO_3)_3.6H_2O$; strontium nitrate, anhydrous; chromium nitrate hydrate, such as $Cr(NO_3)_3.9H_2O$; yttrium nitrate hydrate, such as $Y(NO_3)_3.6H_2O$; calcium nitrate hydrate, such as $Ca(NO_3)_2.4H_2O$; barium nitrate; copper nitrate hydrate, such as $Cu(NO_3)_2.3H_2O$; bismuth nitrate hydrate, such as $Bi(NO_3)_3.5H_2O$; nickel nitrate hydrate, such as $Ni(NO_3)_2.6H_2O$; iron nitrate hydrate, such as $Fe(NO_3)_2.6H_2O$; zirconium nitrate pentahydrate, manganese (II) nitrate tetrahydrate, aluminum nitrate hydrate, such as $Al(NO_3)_3.9H_2O$, cerium nitrate hydrate such as $Ce(NO_3)_4.6H_2O$ or combinations of these metal salt reactants.

The co-reactant, particularly an amino acid, is combined with a metal salt in aqueous mixture to produce the subject precursor material. It is important that the co-reactant compound employed have a relatively high water solubility, good complexing properties, and, after evaporation, will combust with as little residue as possible. The amino acid of choice is glycine because it the simplest amino acid, is readily available, inexpensive, and requires the least amount of oxidant to combust. Other amino acids such as glycine, alanine, valine, leucine, isoleucine, proline, aspartic acid, glutamic acid, lysine, arginine, histidine, asparagine, glutamine, serine, threonine, phenylalanine, tyrosine, and tryptophan can be suitable in this invention.

In the precursor mixture, the ratio of amino acid to metal cation is from about a mole ratio of 0.5:1 up to a ratio of about 6:1. The best product usually results when the glycine-to-cation molar ratio is adjusted to produce the largest bulk volume of ash. Sufficient water is added to dissolve the metal salts and the amino acid.

Ammonium nitrate and additional amino acid may be added to the aqueous solution of metal nitrates and amino acid to increase the bulk volume of the ash produced.

The precursor mixture may be formed in some instances under acidic or basic conditions. However, it is preferred that the pH of the mixture be approximately neutral.

The precursor mixture is formed into an intermediate material, preferably in the form of a glass-like intermediate material, by evaporating water therefrom. The amine and carboxylic acid end groups of the amino acid bind with the metal cations in mixture, thereby increasing the solubility of the metal salt and inhibiting inhomogeneous precipitation thereof. Thus, as the precursor aqueous mixture is concentrated by evaporation of excess water, a material results, in which diffusion and therefore precipitation of individual components, is inhibited.

The intermediate material has a relatively low ignition temperature, and can be easily heated to the point of autoignition. For example, the autoignition temperature of an intermediate formed from lanthanum nitrate hydrate, strontium nitrate, and chromium nitrate hydrate is about 200° C.

When the precursor solution is ignited, the nitrate or other anion usually serves as the principal oxidizer for the combustion of the amino acid. Oxygen from the air may also participate in combustion of some of the amino acid, depending on the ratio of amino acid to nitrate in the precursor solution and the identity of the amino acid. However, the combustion temperature and the general vigor of the combustion reaction decreases as the required amount of air increases. For example, in the case of $(La,Sr)CrO_3$ prepared from the metal nitrates and glycine, the most vigorous combustion and highest combustion temperatures occurred when two glycine molecules were present in the precursor solution for every three nitrate ions, which corresponds to about two glycine molecules per metal cation. When the quantity of glycine was increased to one glycine molecule per nitrate ion, or three glycine molecules per metal cation, the combustion reaction was much slower and occurred at a much lower temperature.

Thus, combustion generally occurs at a temperature that will consume substantially all of the amino acid, but will neither substantially melt the metal oxide powder (which causes excessive sintering of the particles), nor volatilize any of the metal oxide components causing substantial loss of stoichiometry of the final powder product. Control over the combustion temperature therefore can be very important. Excessive sintering of the ceramic powder particles will result if the combustion temperature is at too high a level so that the particles melt; loss of some of the more volatile components can also occur at the highest combustion temperatures. For example, for the high critical temperature superconductor yttrium barium cuprate, use of three glycine molecules for every four nitrate ions, equivalent to two glycine molecules per metal cation, gave a combustion temperature that was too high to form a useful powder. The ceramic particles sintered to form large, porous chunks; the product also was not superconducting after the usual thermal processing, indicating some loss of stoichiometry or formation of incorrect crystalline phases. However, when nine glycine molecules were present for every eight nitrate ions, equivalent to three glycine molecules per metal cation, particles formed were submicron in diameter; with subsequent thermal processing, the product exhibited superconducting properties. Refractory ceramic materials such as $(La,Sr)CrO_3$, because of their much higher melting temperatures, are much less sensitive to the combustion temperature. Acceptable products can be formed over a much wider range of amino acid to metal or nitrate ratios in the precursor solution.

Although very little residue remains in the ash after ignition of the metal salt/amino acid intermediate material, any remaining nitrate or carbon can be driven off and essentially eliminated by volatizing same by calcination or other like techniques. Typically, calcination can be accomplished at temperatures of 700° C., or less, using readily available equipment, such as a common laboratory muffle furnance or the like. The metal oxide particles will generally grow in size during the calcination process.

Metal oxide powder products which can be produced by this invention include the following: lanthanum strontium chromite, yttrium calcium chromite, lanthanum strontium manganite, yttrium calcium manganite, yttrium barium copper oxide, bismuth calcium strontium copper oxide, nickel oxide-nickel ferrite, yttria-stabilized zirconia, calcium zirconate, strontium zirconate, manganese ferrite, lanthanum strontium ferrite, zirconium aluminate cerium zirconium oxide, and lanthanum strontium aluminum chromite. The structure formula of specific metal oxide materials which can be produced by this invention are as follows: $La_{1-x}Sr_xCrO_3$, where $x=0$ to 1.0; $Y_{1-x}Ca_xCrO_3$, where $x=0$ to 1.0; $YBa_2Cu_3O_{7-x}$, where $x=0.06$; $Bi_2CaSr_2Cu_2O_9$; $NiO-NiFe_2O_4$; 0-20% mole percent $Y_2O_3,ZrO_2$; $CaZrO_3$; $SrZrO_3$; $MnFe_2O_4$; $La_{0.75}Sr_{0.25}FeO_3$; $(ZrO_2)_x(Al_2O_3)_{1-x}$, where $x=0.0$ to 1.0; $La_{1-x}Sr_xMnO_3$, where $x=0.0$ to 1.0; $Y_{1-x}Ca_xMnO_3$, where $x=0.0$ to 1.0; $CeO_2.ZrO_2$, and $La_{1-y}Sr_yCr_{1-x}Al_xO_3$, where $y=0$ to 0.3 or $x=0$ to 0.3.

The fine, metal oxide particles of this invention are useful in numerous ceramic applications. Primary metal oxide particles are typically in a narrow particle size distribution range, and are generally not more than about 1 micrometer (1000 nm) in diameter. More specifically, the fine particles produced by the process of the present invention are of a submicron particle size, the primary particle diameter being preferably in the range of about 10 to 700 nm, and more preferably about 20 to 500 nm, and most preferably about 20 to 300 nm.

The subject metal oxide powders can comprise a single crystalline phase, if such is desire, as determined by X-ray diffraction (XRD) analysis. For example, X-ray diffraction analyses were performed for the calcined (750° C. for 4 hrs) and uncalcined ash of the composition $La_{0.84}Sr_{0.16}CrO_3$. The uncalcined ash of that composition gave only diffraction lines expected for materials which have a perovskite structure, but were broadened due to the very small particle size of the product. More importantly, no diffraction lines were visible corresponding to individual reactant component oxides or phases other than La(Sr)CrO₃ which indicated that the metal oxide powders were single-phased.

The submicron particles of the invention herein have a relatively high surface area, particularly in view of their submicron size. For example, particles of the composition $La_{0.84}Sr_{0.16}CrO_3$ exhibit a BET surface area of about 25 square-meters per gram.

EXAMPLE 1

Lanthanum strontium chromite fine ceramic powders were produced according to the present invention. This material can be used as bipolar or current interconnecting material in the previously described solid oxide fuel cells. Lanthanum strontium chromite is very difficult to produce by conventional methods.

The following describes a preferred preparation method of $La_{1-x}Sr_xCrO_3$:

0.0084 moles of lanthanum nitrate hydrate [La(NO₃)₃.6H₂O], 0.0016 moles of strontium nitrate, anhydrous [Sr(NO₃)₂], 0.01 moles of chromium nitrate hydrate [Cr(NO₃)₃.9H₂O], 0.06 moles of glycine [HOOCCH₂-NH₂], appropriate to prepare 0.01 moles of $La_{0.84}Sr_{0.16}CrO_3$, were dissolved in a minimum quantity of deionized water. The three metal nitrates and glycine formed a homogeneous, aqueous precursor mixture. The precursor mixture was heated on a hot plate (or in an oven) to evaporate a substantial portion of the water, until the concentration of the solution was approximately 1 mole/liter in terms of the product oxide phase.

Approximately 15 ml (at a time) of the concentrated solution was placed in a 1,000 ml glass beaker. This small aliquot was heated on a hot plate until it boiled, evaporating the remaining free water. The viscous, evaporated precursor solution was then further heated until the autoignition temperature was reached.

The mixture temperature was raised to approximately 200° C. and autoignition of the evaporated precursor mixture occured. The residual ash left in the beaker after autoignition consisted of low density ash containing very fine primary particles of (La,Sr)CrO₃. The residual ash was calcined at approximately 650° C. for 4 hours to drive off volatile residuals, which constituted less than one weight percent of the ash.

Fine primary ceramic particles were formed having diameters ranging between approximately 20 and 100 nanometers, and consisting of one crystalline phase. These submicron powders had a surface area greater than 20 square meters per gram. These particles were sinterable in air at 1550° C. to a density of greater than 95 percent of their theoretical density.

X-ray diffraction analyses were performed for the uncalcined ash and for ash calcined at 650° C. for 4 hours. The uncalcined ash gave only diffraction lines expected for the perovskite structure, but were somewhat broadened due to the very small particle size of the powder. Most importantly, no diffraction lines were visible corresponding to the individual component oxides (Cr₂O₃, SrO, or La₂O₃) of the ceramic oxide product or phases other than (La,Sr)CrO₃. Following calcination, diffraction lines sharpened, due to growth of ceramic particles within the ash. 0.01 moles (approximately 2.3 grams) of $La_{0.84}Sr_{0.16}CrO_3$ powder were produced by the process of this invention.

EXAMPLE 2

The procedure outlined in Example 1 was repeated with the exception of the use of different starting materials, as follows:
  yttrium nitrate hydrate [Y(NO₃)₃.6H₂O]
  calcium nitrate hydrate [Ca(NO₃)₂.4H₂O]
  chromium nitrate hydrate [Cr(NO₃)₃.9H₂O]

Yttrium calcium chromite compounds are closely related to the (La,Sr)CrO₃ compounds in Example 1. Both families of compounds are known to be stable at high temperature and to exhibit good electrical properties. Submicron, single-phase (Y,Ca)CrO₃ powders were prepared of the structural formula $Y_{(1-x)}Ca_xCrO_3$.

EXAMPLE 3

0.01 moles (approximately 6.6 grams) of the high temperature oxide ceramic material $YBa_2Cu_3O_{7-x}$, where superconducting properties are optimized for $x=0.06$, was prepared. High temperative superconductors are likely to find wide application in energy conservation technology, sensors, magnets, and magnetic shielding. The procedure of Example 1 was repeated using the following starting materials in their appropriate stoichiometric quantities:

0.01 moles of yttrium nitrate hydrate $[Y(NO_3.6H_2O]$
0.02 moles of barium nitrate
0.03 moles of copper nitrate hydrate $[Cu(NO_3)_2.3H_2O]$ The product $YBa_2Cu_3O_{7-x}$ ceramic powder was pressed into a pellet and sintered to the orthorhombic phase at approximately 950° C. The pellets were furnace cooled to 450° C. and annealed in flowing oxygen at that temperature. The critical temperature for pellets made using this method is greater than 88° K.

EXAMPLE 4

Preparation of a $Bi_2CaSr_2Cu_2O9$ powder followed the procedure outlined in Example 1, except for the use of the following starting materials.

calcium nitrate hydrate $[Ca(NO_3)_2.4H_2O]$
bismuth nitrate hydrate $[Bi(NO_3)_3.5H_2O]$
copper nitrate hydrate $[Cu(NO_3)_2.3H_2O]$
strontium nitrate $[Sr(NO_3)_2]$ This composition has also been shown to exhibit superconducting properties above the temperature of liquid nitrogen.

EXAMPLE 5

Nickel oxide-nickel ferrite powders were prepared using the procedure of Example 1, except for the following starting materials:

nickel nitrate hydrate $[Ni(NO_3)_2.6H_2O]$
iron nitrate hydrate $[Fe(NO_3)_2.6H_2O]$ The mixed phase ceramic nickel oxide-nickel ferrite $[NiO-NiFe_2O_4]$ may be used as an inert anode in the refining of aluminum metal. The material is known to have good electronic conductivity and has good corrosion resistance in the extreme environments of aluminum refining.

EXAMPLE 6

Zirconia and yttria-stabilized zirconia (0-20 mole percent $Y_2O_3$) were prepared using the procedure of Example 1, except that the starting materials are zirconium nitrate pentahydrate, yttrium nitrate hexahydrate, and glycine.

The ceramic product material is known to be stable at elevated temperatures, and has found use in sensor technology, wear-resistant materials, and corrosion-resistant materials, among numerous other uses.

EXAMPLE 7

Using the same procedure as described in Example 1, calcium nitrate tetrahydrate and zirconium nitrate pentahydrate were combined to produce a calcium zirconate ceramic powder. Calcium zirconate is a refractory material having good electrical properties.

EXAMPLE 8

Using the same procedure as described in Example 1, strontium nitrate and zirconium nitrate pentahydrate were combined to produce strontium zirconate. Strontium zirconate is a refractory material with good electrical properties.

EXAMPLE 9

Using the same procedure as described in Example 1, manganese (II) nitrate tetrahydrate and iron (II) nitrate hexahydrate were combined to produce manganese ferrite. Manganese ferrite is a refractory ceramic with good magnetic and electronic properties.

EXAMPLE 10

Using the same procedure as described in Example 1, lanthanum nitrate hexahydrate, strontium nitrate, and iron (II) nitrate hexahydrate were combined to produce lanthanum strontium ferrite. Lanthanum strontium ferrite is a refractory ceramic with good magnetic and electronic properties.

EXAMPLE 11

Using the same procedure described in Example 1, lanthanum nitrate hexahydrate, strontium nitrate, and manganese (II) nitrate tetrahydrate were combined to produce lanthanum strontium manganite, of the formula $La_{1-x}Sr_xMnO_3$, where $x=0.0$ to $1.0$. Lanthanum strontium anganite is a refractory ceramic with good magnetic and electrical properties.

EXAMPLE 12

Using the same procedure described in Example 1, yttrium nitrate hexahydrate, calcium nitrate tetrahydrate, and manganese (II) nitrate tetrahydrate were combined to produce yttrium calcium manganite, of the formula $Y_{1-x}Ca_xMnO_3$, where $x=0.0$ to $1.0$. Yttrium calcium manganite is a refractory ceramic with good magnetic and electrical properties.

EXAMPLE 13

Using the same procedure described in Example 1, zirconium nitrate pentahydrate and aluminum nitrate nonahydrate were combined to produce an aluminum oxide-zirconium oxide composite. This material has applications as a structural ceramic.

EXAMPLE 14

Using the same procedure described in Example 1, cerium nitrate hexahydrate and zirconium nitrate pentahydrate were combined to produce ceria-zirconia $CeO_2.ZrO_2$). This refractory ceramic has good electrical properties.

EXAMPLE 15

Using the same procedure as described in Example 1, lanthanum nitrate hydrate, strontium nitrate, aluminum nitrate hydrate, and chromium nitrate hydrate were combined to produce lanthanum strontium aluminum chromite $La_{1-y}Sr_yCr_{1-x}Al_xO_3$, where $y=0.0$ to $0.3$ and $x=0.0$ to $0.3$. This refractory ceramic exhibits good electrical conductivity.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

We claim:

1. A process for producing a metal oxide powder, which comprises
   forming a substantially homogeneous, aqueous precursor mixture comprising at least one substantially water soluble metal salt and a substantially water soluble combustible amino acid compound;
   evaporating said aqueous precursor mixture to form a substantially homogeneous intermediate material having a concentration which will support combustion; and
   heating said intermediate material to the point of autoignition thereby autoigniting and combusting said intermediate material to produce said metal oxide powder.

2. The process of claim 1, wherein said amino acid compound comprises glycine.

3. The process of claim 1, wherein said metal salt has an anion which comprises a nitrate.

4. The process of claim 1, wherein said combustion step is conducted at a temperature which will consume substantially all of said amino acid compound, but will neither substantially melt said metal oxide powder nor cause the loss of volatile metal oxide components resulting in a substantial loss of stoichiometry.

5. The process of claim 1, wherein said metal salt has a cation which comprises any one of aluminum, calcium, chromium, manganese, iron, nickel, copper, strontium, yttrium, zirconium, silver, barium, lanthanum, bismuth, lithium, sodium, magnesium, potassium, scandium, zinc, rubidium, cadmium, indium, cesium, mercury, thallium, lead, cerium, praseodymium, neodymium, samarium, europium, gadolinium, terbium, dysprosium, holmium, cobalt, hafnium, molybdenum, erbium, thulium, ytterbium, lutetium, uranium and thorium, respectively.

6. The process of claim 1, wherein said metal oxide powder comprises any one of lanthanum strontium chromite, yttrium calcium chromite, lanthanum strontium manganite, yttrium calcium manganite, ceria-zirconia, alumina-zirconia, lanthanum strontium aluminum chromite, yttrium barium copper oxide, bismuth calcium strontium copper oxide, nickel oxide-nickel ferrite, yttria-stabilized zirconia, calcium zirconate, strontium zirconate, manganese ferrite, and lanthanum strontium ferrite.

7. The process of claim 1, wherein said metal salt comprises any one of lanthanum nitrate hydrate, strontium nitrate, chromium nitrate hydrate, yttrium nitrate hydrate, calcium nitrate hydrate, barium nitrate, copper nitrate hydrate, bismuth nitrate hydrate, strontium nitrate, nickel nitrate hydrate, iron nitrate hydrate, zirconium nitrate pentahydrate, yttrium nitrate hexahydrate, manganese nitrate tetrahydrate, iron nitrate hexahydrate, and lanthanum nitrate hexahydrate, aluminum nitrate hydrate, cerium nitrate hexahydrate, cobalt nitrate hydrate, zinc nitrate hydrate, hafnium nitrate hydrate, and molybdenum nitrate hydrate.

8. The process of claim 1, wherein said metal salt has an anion which comprises any one of an acetate, formate, halide, oxyhalide, sulphate, carbonate and nitrate.

9. The process of claim 1, wherein the metal oxide powder is a fine metal oxide powder having a particle diameter in the range of about 10 to 700 nm.

10. The process of claim 1, wherein said amino acid compound comprises any one of glycine, alanine, valine, leucine, isoleucine, proline, aspartic acid, glutamic acid, lysine, arginine, histidine, asparagine, glutamine, serine, threonine, phenylalanine, tyrosine, and tryptophan.

11. The process of claim 1, wherein the metal oxide powder is a fine metal oxide powder having a particle diameter in the range of not more than about 1000 nm.

12. The process of forming a substantially homogeneous, precursor aqueous mixture for use in producing a metal oxide powder, consisting essentially of
   providing at least one substantially water soluble metal salt;
   combining said water-soluble metal salt with a substantially water soluble combustible amino acid to form said precursor aqueous mixture, said precursor aqueous mixture being heatable to the point of autoignition, and thereby being autoignited and combusted to produce said metal oxide powder; and
   igniting said intermediate material to form a metal oxide powder.

13. The process of claim 12, which further includes the step of volatizing said metal oxide powder to drive off substantially all remaining carbon and metal salt anion, respectively.

14. The process of claim 12, wherein said water soluble combustible amino acid comprises glycine.

15. The process of claim 12, wherein said water-soluble metal salt has an anion which comprises a nitrate.

16. The process of claim 12, wherein said combustion step is conducted at a temperature which will consume substantially all of said amino acid compound, but will neither substantially melt said metal oxide powder nor cause the loss of volatile metal oxide components resulting in a substantial loss of stoichiometry.

17. The process of claim 12, wherein said metal salt has a cation which comprises any one of aluminum, calcium, chromium, manganese, iron, nickel, copper, strontium, yttrium, zirconium, silver, barium, lanthanum, bismuth, lithium, sodium, magnesium, potassium, scandium, zinc, rubidium, cadmium, indium, cesium, mercury, thallium, lead, cerium, praseodymium, neodymium, samarium, europium, gadolinium, terbium, dysprosium, holmium, cobalt, hafnium, molybdenum, erbium, thulium, ytterbium, lutetium, uranium and thorium, respectively.

18. The process of claim 12, wherein said metal oxide powder comprises any one of lanthanum strontium chromite, yttrium calcium chromite, lanthanum strontium manganite, yttrium calcium manganite, ceria-zirconia, alumina-zirconia, lanthanum strontium aluminum chromite, yttrium, barium copper oxide, bismuth calcium strontium copper oxide, nickel oxide-nickel ferrite, yttria-stabilied zirconia, calcium zirconate, strontium zirconate, manganese ferrite, and lanthanum strontium ferrite.

19. The process of claim 12, wherein said metal comprises any one of lanthanum nitrate hydrate, strontium nitrate, chromium nitrate hydrate, yttrium nitrate hydrate, calcium nitrate hydrate, barium nitrate, copper nitrate hydrate, bismuth nitrate hydrate, strontium nitrate, nickel nitrate hydrate, iron nitrate hydrate, zirconium nitrate pentahydrate, yttrium nitrate hexahydrate, manganese nitrate tetrahydrate, iron nitrate hexahydrate, and lanthum nitrate hexahydrate, aluminum nitrate nonahydrate, cerium nitrate hexahydrate, cobalt nitrate hydrate, zinc nitrate hydrate, hafnium nitrate hydrate, and molybdenum nitrate hydrate.

20. The process of claim 12, wherein said metal salt has an anion which comprises any one of an acetate, formate, halide, oxyhalide, sulphate, carbonate and nitrate.

21. The process of claim 12, wherein said amino acid compound comprises any one of glycine, alanine, valine, leucine, isoleucine, proline, aspartic acid, glutamic acid, lysine, arginine, histidine, asparagine, glutamine, serine, threonine, phenylalanine, tyrosine, and tryptophan.

* * * * *